United States Patent [19]

Spielberger et al.

[11] 3,942,891

[45] Mar. 9, 1976

[54] RADIOMETER PROBE

[75] Inventors: Seymour C. Spielberger, Roslyn Heights, N.Y.; Robert C. Savoca, New Canaan, Conn.

[73] Assignee: Barnes Engineering Company, Stamford, Conn.

[22] Filed: Jan. 29, 1975

[21] Appl. No.: 544,988

[52] U.S. Cl.................... 356/43; 73/355 R; 356/44
[51] Int. Cl.².......................................... G01J 5/48
[58] Field of Search............................ 356/43–50; 73/355 R, 355 EM

[56] References Cited
UNITED STATES PATENTS

| | | | |
|---|---|---|---|
| 1,282,967 | 10/1918 | Smith | 356/44 |
| 1,319,805 | 10/1919 | Smith | 356/50 |

*Primary Examiner*—Vincent P. McGraw
*Attorney, Agent, or Firm*—Joseph Levinson; Robert Ames Norton

[57] ABSTRACT

A hand-held radiometer for non-contact temperature measurement of objects is provided with a probe which is adapted to be mounted on the optical barrel of the radiometer to permit the radiometer to which it is attached to provide contact temperature measurements. The probe comprises a thin plastic film of low thermal mass which is shaped on one end thereof to be easily deformed when brought into contact with a specimen whose temperature is desired to be measured. The inner surface of the plastic film has a high emissivity, and a retainer means is provided on the other end of the thin plastic film for mounting the probe on the optical barrel of the radiometer.

4 Claims, 3 Drawing Figures

U.S. Patent  March 9, 1976  3,942,891
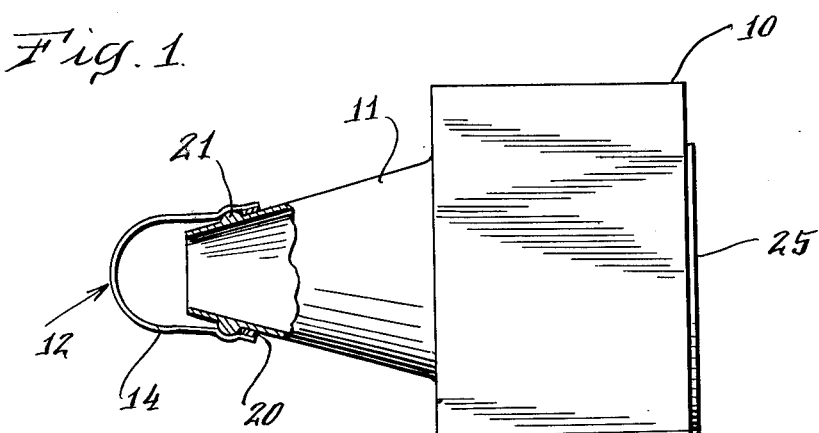
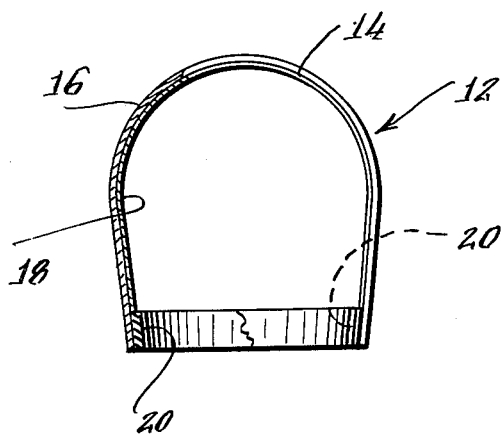
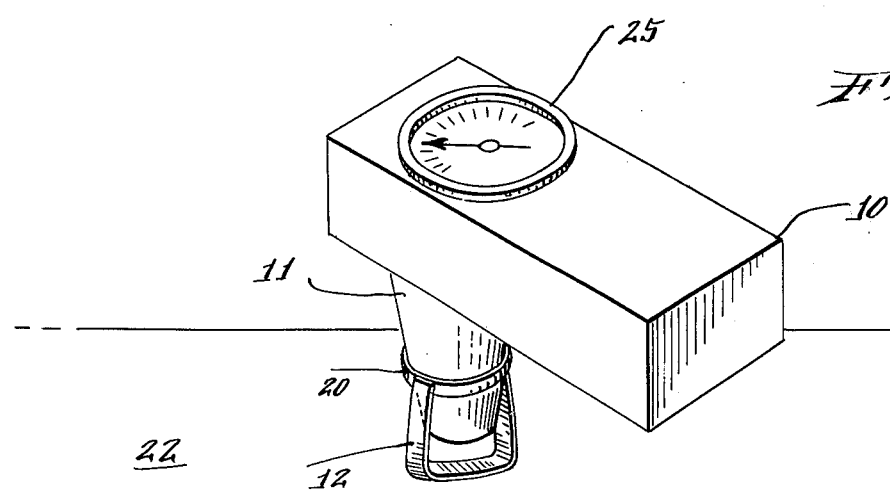

RADIOMETER PROBE

BACKGROUND OF THE INVENTION

This invention relates to a radiometer probe which is adapted to be attached to a non-contact temperature-measuring radiometer for providing such a radiometer with a contact temperature-measuring capability.

Portable, or hand-held, radiometers have been used extensively to conveniently measure temperatures of various objects without physical contact. Temperature measures of the contact type suffer the disadvantage of disturbing the temperature of the object into which it comes in contact. However, non-contact temperature-measuring radiometers have a difficult time of measuring temperatures of objects or specimens in which the emissivity is unknown, and especially where the specimen does not have a high emissivity. Emissivity may be defined as the ratio of the radiation emitted by an object to the radiation which would be emitted by a "black body" at the same temperature. When the emissivity is unknown, and particularly when it is small, the infrared radiation emitted by the object or specimen being measured bears little relation to the actual temperature of the specimen or object. Accordingly, the radiometric sensed temperature may be in large error. If the emissivity is known, the instrument may be calibrated with respect to such emissivity to provide accurate measurements.

SUMMARY OF THE INVENTION

Accordingly, it is an object of the present invention to provide a radiometer probe adapted to be mounted on a radiometer wherein the temperature measurements can be made without regard to the emissivity of the object whose temperature is being measured.

Another object of this invention is to provide a radiometer probe which enables the use of the same radiometer for both contacting and non-contacting temperature measurements.

A further object of this invention is to provide a radiometer probe which does not thermally load the object whose temperature is desired to be measured when placed in contact therewith.

A still further object of this invention is to provide a radiometer probe which allows contact measurement of an object which approaches non-contact radiometric speeds.

Another object of this invention is to provide a radiometric probe which can be used to calibrate a radiometer for the emissivity of a source to be monitored.

In carrying out this invention in one illustrative embodiment thereof, a radiometer probe is provided having a thin plastic film of low thermal mass which is shaped on one end thereof to easily deform when brought into contact with an object whose temperature is desired to be measured. The inner surface of the plastic film has a high emissivity which, when attached to the optical barrel of a radiometer by a retaining means, allows the radiometer field of view to view the inner surface of the plastic film for providing the contact temperature measurements therefrom.

BRIEF DESCRIPTION OF THE DRAWINGS

FIG. 1 shows a side elevational view of a hand-held radiometer having mounted thereon a radiometer probe in accordance with the present invention.

FIG. 2 shows one form of radiometer probe in accordance with the present invention.

FIG. 3 shows the radiometer probe on the radiometer of FIG. 1 in position for a contact measurement of a surface in accordance with the present invention.

DESCRIPTION OF THE PREFERRED EMBODIMENT

Referring now to FIG. 1, there is shown a hand-held radiometer 10 having an optical barrel 11 with a radiometer probe 12 mounted thereon. The radiometer 10 functions in a well known manner to provide non-contact temperature measurements of an object in the field of view of the optical barrel 11. Radiation from the object whose temperature is being measured is collected and applied to an infrared detector in the radiometer 10 which is suitably processed and converted to a visual temperature indication by any suitable means, such as a meter 25. A portable or hand-held radiometer 10 is not described in detail, since the specific details thereof do not constitute a part of this invention other than the fact that the radiometric probe 12 is attached thereto and performs functions which will be described hereinafter in combination with the radiometer. The radiometer 10 may be of any conventional form which is commercially available.

Referring now to FIG. 2, the probe 12 comprises a thin plastic film 14 having a low thermal mass which is shaped on one end thereof in a loop 16 to contact a specimen whose temperature is desired to be measured by the radiometer. The thin plastic film may consist of polyethylene terephthalate, which is sold under the trade name of Mylar, acetate, or the equivalent may be used. The plastic film 14 is on the order of .001 in. thick. The inner surface 18 of the thin plastic film 14 has a high emissivity, which may be due to the inherent characteristics of the thin plastic film 14 which is used, or which may be provided by a coating on the inner surface 18 of any of the commercially available optical black paints, for example Eastman Kodak Black, 3M Black, etc., which have been found suitable for this purpose. A holder or retainer 20 on which the film 14 is mounted on one end thereof is designed to conveniently slip over and frictionally engage the optical barrel 11 of the radiometer 10, or to conveniently clamp the probe 12 on the radiometer barrel 11 in cooperation with a projection 21 on the barrel 11 or in other suitable manner which detachably mounts the probe 12 on the optical barrel 11. A loop 16, which is formed on the other end of the probe 12, is easily deformed so as to make good thermal contact with a specimen without applying a great deal of pressure on the probe 12 via the radiometer 10. The low thermal mass of the loop 16 of the thin plastic film 14 does not upset the temperature measurement when it comes into contact with an object.

As is shown in FIG. 3, in use, the probe 12 is brought into contact with the surface of a specimen 22 whose temperature is to be measured. The deformability of the plastic strip 14 along loop 16 provides good thermal contact between the probe 12 and the surface 22 with little difficulty. The low thermal mass of the probe 12 provides very little lateral thermal conductivity in the film, which in effect does not disturb the surface temperature of the specimen 22 whose temperature is being measured. Regardless of the emissivity of specimen 22, thin film 14 of the probe 12 will rise in temperature in a second or two through its conductive coupling to the specimen 22 to approximately the same temperature as the specimen. The high emissivity inner surface 18 of the thin plastic film 14 is viewed by the radiometer 10 through its optical barrel and presents to the radiometer 10 a heated source from which an accurate temperature can be measured.

It will be apparent that other shapes and configurations of the probe 12 may be employed. The probe in its illustrated form has the thin plastic film 14 in strip form. However, other forms may be utilized, for example a spherical shape. Also, a variety of retaining means may be used, depending on the type of optical barrel shape provided by the radiometer on which the probe is used.

The probe which is illustrated enables the same radiometer to be utilized for both contact and non-contact temperature measurements. This extends the usefulness as well as the capability of a non-contact radiometer. Temperature measurements may be accomplished without regard to the emissivity of the object being measured. For example, nondestructive testing of circuit boards and miniature electronic devices can be temperature tested without knowing the emissivity of the particular solder joint or circuit element. Because of the low thermal mass of the thin film of the probe, the film heats up almost instantaneously, providing quick measurements approaching non-contact radiometric speeds. Since the thin film of the probe has little lateral thermal conductivity, the placing of the film in contact with the specimen does not thermally load the specimen and thereby change its temperature. The radiometric probe in accordance with the invention can also be used to calibrate the radiometer for use with a source which has low emissivity, thereby extending the usefulness of the radiometer. The probe can be used initially to determine the emissivity of the source to be monitored which, when known, allows non-contact measurements to be accurately made.

Since other modifications and changes, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

We claim:

1. A radiometer probe adapted to be removedly attached to the optical barrel of a radiometer, comprising
   a. a probe having a thin plastic film of low thermal mass shaped to be easily deformed when brought into contact on one end thereof with a specimen whose temperature is desired to be measured whereby the thin film rapidly assumes the temperature of the specimen with which contact is made,
   b. the inner surface of said thin plastic film having a high emissivity, and
   c. retaining means on the other end of said thin plastic film for mounting said probe on the optical barrel of a radiometer whereby the radiometer views the inner surface of said thin plastic film from which an accurate temperature measurement of a specimen in contact with said probe can be made by the radiometer.

2. The radiometer probe set forth in claim 1 wherein said high emissivity of said inner surface of said radiometer probe comprises a high emissivity coating on said inner surface.

3. The radiometer probe set forth in claim 1 wherein said high emissivity of said inner surface of said radiometer probe comprises the material of said thin plastic film which has an inherent high emissivity.

4. The radiometer probe set forth in claim 1 wherein said retaining means comprises an annular clamping means adapted to frictionally engage the outer surface of an optical barrel of a radiometer.

* * * * *